(No Model.)

C. JAPTOK.
JOINT FOR DRAIN AND OTHER PIPES.

No. 259,764. Patented June 20, 1882.

WITNESSES:

INVENTOR
Carl Japtok
BY
ATTORNEY

UNITED STATES PATENT OFFICE.

CARL JAPTOK, OF NEW YORK, N. Y.

JOINT FOR DRAIN AND OTHER PIPES.

SPECIFICATION forming part of Letters Patent No. 259,764, dated June 20, 1882.

Application filed March 16, 1882. (No model.)

*To all whom it may concern:*

Be it known that I, CARL JAPTOK, of the city, county, and State of New York, have invented certain new and useful Improvements in Joints for Drain and other Pipes, of which the following is a specification.

This invention has reference to an improved joint or coupling for drain and other pipes, whereby the same may be laid more accurately and jointed in a more reliable and effective manner.

The invention consists of a pipe provided with an enlarged annular female portion, which female portion is contracted at its outer end, and recessed transversely at one side thereof. The male end of the adjoining pipe-section is beveled, and retained by a seat at the interior and by a seat at the outer end of the female portion. A detachable segmental section of the female portion fits into the recess of the same, so as to close the same after the cement filling has been inserted into the space between the male and female ends of the adjoining pipe-sections.

Figure 1:
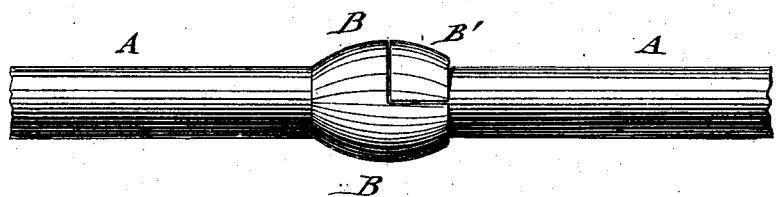
Figure 2:
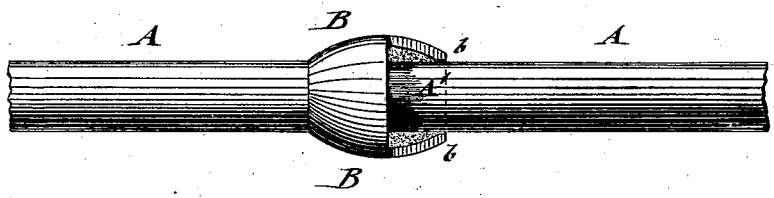
Figure 3:
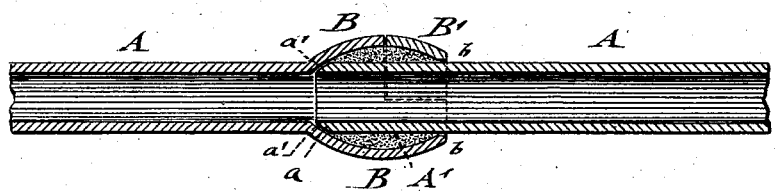

In the accompanying drawings, Figure 1 represents a side view; Fig. 2, a top view with the segmental cover removed; and Fig. 3 is a vertical longitudinal section of my improved joint for drain and other pipes.

Similar letters of reference indicate corresponding parts.

A in the drawings represents a drain or other pipe of any suitable material, which is provided at one end with a male portion, A', having a straight or beveled edge, $a$, and at the other end with an enlarged annular female portion, B, which is curved in such a manner as to be widest near its middle portion, and contracted at the outer end, the diameter of the outer end being slightly larger than the diameter of the body of the pipe. The female portion B is recessed transversely for a segmental section or cover, B', which fits into the recess and completes the female portion when placed in position thereon. The inner edge of the contracted end of the female portion B is made flat, so as to form a concentric seat for the male end A' of the adjoining pipe-section A, said seat forming, in connection with a straight or beveled seat $a'$ at the interior of the female portion B, at the point where it connects with the body of the pipe, a double support for the male portion A', whereby the pipes can be laid in a quick, convenient, and accurate manner without specially adjusting the same. When the pipe ends have thus been placed in position the space between the male and female portions is filled with cement, and finally the completing-segment B' of the female portion B pressed down upon the cement, so that the latter is tightly forced into the annular space between the pipe ends, and thereby a tight and reliable joint of the same produced.

The segmental section B' of the female portion B may be omitted, as the joint of the pipes can be made without the same, though I prefer to use it, especially as in case of any obstruction in the pipe-sections a hole may be drilled at that point of the pipe covered by the segmental section, which hole is plugged again after the removal of the obstruction, and then covered by the completing-section B'.

Having thus described my invention, I claim as new and desire to secure by Letters Patent—

1. A drain-pipe having an enlarged annular female portion contracted at the outer end and provided with a transverse segmental recess, substantially as set forth.

2. The combination of a pipe-section having an enlarged female portion, which is contracted at the outer end and recessed transversely at one side, with the male end of the adjoining pipe-section and a filling-layer of cement inserted into the space between the male and female portions of the pipe, substantially as described.

3. The combination of a pipe-section having an enlarged female portion, which is contracted at the outer end and provided with a transverse recess, with the male end of the adjoining pipe-section, a cement filling, and a detachable section fitted into the recess of the female portion, substantially as specified.

4. The combination of a pipe-section, A, having an enlarged and recessed female portion, B, contracted at the outer end and provided with interior seats, $a'$ $b'$, with a male portion, A', having a seat, $a$, a cement filling, and a detachable section or cover, B', fitting into the recess of the female portion B, substantially as set forth.

In testimony that I claim the foregoing as my invention I have signed my name in presence of two subscribing witnesses.

CARL JAPTOK.

Witnesses:
PAUL GOEPEL,
CARL KARP.